United States Patent
Norikane et al.

(10) Patent No.: US 7,518,086 B2
(45) Date of Patent: Apr. 14, 2009

(54) METHOD AND DEVICE FOR ADJUSTING WAVELENGTH DISTRIBUTION PATTERN IN LASER

(75) Inventors: Yoshihiro Norikane, Yokohama (JP); Manabu Seo, Atsugi (JP); Yasufumi Yamada, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 622 days.

(21) Appl. No.: 11/083,738

(22) Filed: Mar. 18, 2005

(65) Prior Publication Data

US 2005/0205536 A1    Sep. 22, 2005

(30) Foreign Application Priority Data

Mar. 19, 2004    (JP)    .............................. 2004-080733

(51) Int. Cl.
*B23K 26/00* (2006.01)
*B41J 2/435* (2006.01)
*G11B 7/00* (2006.01)

(52) U.S. Cl. .......................... 219/121.61; 219/121.77; 219/121.8; 347/224; 369/100

(58) Field of Classification Search ...............................
219/121.65–121.69, 121.72, 121.77; 347/224
See application file for complete search history.

(56) References Cited

U.S. PATENT DOCUMENTS

| | | | | | |
|---|---|---|---|---|---|
| 4,947,398 | A | * | 8/1990 | Yasuda et al. | 372/29.021 |
| 5,000,548 | A | * | 3/1991 | Mercado | 359/656 |
| 5,526,338 | A | * | 6/1996 | Hasman et al. | 369/94 |
| 5,966,364 | A | * | 10/1999 | Kamatani | 369/112.07 |
| 6,016,212 | A | * | 1/2000 | Durant et al. | 398/131 |
| 6,175,096 | B1 | * | 1/2001 | Nielsen | 219/121.72 |
| 6,610,050 | B2 | * | 8/2003 | Bille | 606/5 |
| 6,769,769 | B2 | * | 8/2004 | Podoleanu et al. | 351/221 |
| 6,803,540 | B2 | | 10/2004 | Yamada et al. | |
| 7,065,035 | B1 | * | 6/2006 | Mizuuchi et al. | 369/283 |
| 2003/0010762 | A1 | * | 1/2003 | Koide | 219/121.73 |
| 2003/0213770 | A1 | | 11/2003 | Yamada et al. | |
| 2004/0200818 | A1 | | 10/2004 | Yamada et al. | |
| 2005/0018996 | A1 | | 1/2005 | Seo et al. | |
| 2005/0048383 | A1 | * | 3/2005 | Taniguchi et al. | 430/5 |

(Continued)

FOREIGN PATENT DOCUMENTS

JP    05-104276    4/1993

(Continued)

*Primary Examiner*—Samuel M Heinrich
(74) *Attorney, Agent, or Firm*—Knoble Yoshida & Dunleavy, LLC

(57) ABSTRACT

A plurality of configurations is simultaneously formed in a material by a single laser beam having a desired distribution pattern of wavelengths. An input laser beam has an initial wavelength distribution pattern. The initial wavelength distribution pattern is adjusted or modified into a desired final wavelength distribution pattern. For example, the initial wavelength distribution pattern is a wide range of wavelengths in a single bell-curve distribution while the desired final wavelength distribution pattern has a specific number of sharp peaks each over a predetermined narrow range. The laser beam having the desired final wavelength distribution pattern is focused upon on a material. Because of the multiple peaks in the wavelength distribution, the laser beam is focused at a plurality of the focal distances. A number of structures is simultaneously formed in a material at the multiple focal points or at multiple locations/depths when the above laser beam is projected onto the material.

11 Claims, 10 Drawing Sheets

U.S. PATENT DOCUMENTS

| | | |
|---|---|---|
| 2005/0191771 A1* | 9/2005 | Li et al. .................... 438/14 |
| 2006/0261050 A1* | 11/2006 | Krishnan et al. ....... 219/121.74 |
| 2007/0202619 A1* | 8/2007 | Tamura et al. ............. 438/22 |
| 2008/0151253 A1* | 6/2008 | Korner et al. ............ 356/451 |

FOREIGN PATENT DOCUMENTS

| | | |
|---|---|---|
| JP | 05-192779 | 8/1993 |
| JP | 2000-190088 | 7/2000 |
| JP | 2000329957 A * | 11/2000 |
| JP | 2001-212796 | 8/2001 |
| JP | 2001-332092 | 11/2001 |
| JP | 2002-182546 | 6/2002 |
| JP | 2002-224873 | 8/2002 |
| JP | 2002-311466 | 10/2002 |
| JP | 2003-195023 | 7/2003 |

* cited by examiner

US 7,518,086 B2

METHOD AND DEVICE FOR ADJUSTING WAVELENGTH DISTRIBUTION PATTERN IN LASER

FIELD OF THE INVENTION

The current invention is generally related to laser manufacturing devices, laser manufacturing methods as well as products manufactured by the devices or methods, and more particularly related to laser manufacturing devices and laser manufacturing methods of high-precision components such as internal micro three-dimensional devices and internal refraction varying elements having micro configurations along internal varying points. The current invention is applicable to forming memory pits of an optical memory device, internal processing of optical elements having a refraction varying portion, manufacturing of diffraction optical elements or hologram elements having at least a single internal layer of a refraction varying portion, internal processing of micro machines and micro sensors, processing of chips having internal structures such as micro channels.

BACKGROUND OF THE INVENTION

Relevant prior art for laser processing includes the following:

Japanese Patent Publication 2003-195023 discloses a laser machining method of manufacturing micro three-dimensional structures using less than 1 picosecond ($10^{-12}$) laser. The same reference also discloses the use of more than one laser source to combine the laser beams to form certain structures respectively in a horizontal direction at a predetermined depth.

Japanese Patent Publication 2001-212796 discloses a laser machining method of manufacturing micro three-dimensional structures using less than 1 picosecond ($10^{-12}$) laser in the Gaussian distribution pattern. A combination of selective colors and materials determines an amount of energy absorption from the laser to form a desired configuration. The specified material layers are stratified to form the three-dimensional structures.

Japanese Patent Publication 2002-311466 discloses a laser machining method of manufacturing optical channels in a core area of a non-linear optical element using femt-second laser having 800 nm wavelength.

Japanese Patent Publication 2002-182546 discloses a method of marking a computer generated hologram inside a glass wall of a container using femt-second ($10^{-15}$) laser. The same reference also discloses the placement of the marking at different depths by physically moving a lens for focusing the laser along the optical axis.

Japanese Patent Publication 2001-332092 discloses a method of rewriting data bits in a three-dimensional memory medium by using femt-second ($10^{-15}$) laser by moving the focus point towards the laser source. The rewriting laser has a lower energy level than that of an initial laser writing the original data.

Japanese Patent Publication 5-104276 discloses a method of processing certain materials such as aluminum and copper having a highly reflective surface using a plurality of laser beams including YAG laser. The laser beams are manipulated via a lens, a mirror and a splitter to have a short wavelength (0.53 μm) and a long wavelength (1.06 μm) before combined into a single focused beam. The short-wavelength laser initially processes a surface or shallow portion of the material for a long-wavelength laser process. Subsequently, the long-wavelength laser processes an inner or deep portion of the material below the initially treated surface.

Japanese Patent Publication 5-192779 discloses a method of processing using a plurality of laser beams including YAG laser. A light amount of each of the laser beams having a different wavelength is controlled before reaching a medium having multiple layers of a different material.

Japanese Patent Publication 2002-224873 discloses a method of processing certain materials such as copper having a highly reflective surface using a plurality of laser beams including YAG laser. At least two laser beams including a short wavelength (less than 400 nm) and a long wavelength (400-600 nm) are simultaneously combined into a single focused beam.

Japanese Patent Publication 2000-190088 discloses a method of sequential processing of certain material by a first laser beam and a second laser beam having a third to a fifth of the wavelength of the first laser beam. The second step via the second laser beam performs a cosmetic adjustment.

In the above described laser prior art technologies, laser beams are combined into a single beam to focus upon a common point. In order to form a structure at various depths of the medium, either the laser beam or the medium must be relocated. The laser beam may be refocused at a new depth by adjusting the focus. Alternatively, the medium may be physically moved with respect to the stationary laser beam. Furthermore, since the structure is sequentially formed at a varying depth, the manufacturing process remains to be desired to simultaneously form the multiple structures in order to improve efficiency.

SUMMARY OF THE INVENTION

In order to solve the above and other problems, according to a first aspect of the current invention, a method of processing a material by a laser beam, including the steps of inputting a laser beam having a first predetermined number of peaks over a predetermined range of wavelengths in a first distribution pattern, modifying the first distribution pattern to a second redistribution pattern that has a predetermined desired distribution pattern having a second predetermined number of peaks over the predetermined range of the wavelengths, focusing over the material the laser beam having the desired redistribution pattern of the wavelengths, and simultaneously forming a predetermined set of configurations at a different depth from a surface of the material by the focused laser beam.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Based upon incorporation by external reference, the current application incorporates all disclosures in the corresponding foreign priority document, Japanese Patent Application 2004-080733 from which the current application claims priority.

Figure 1A:
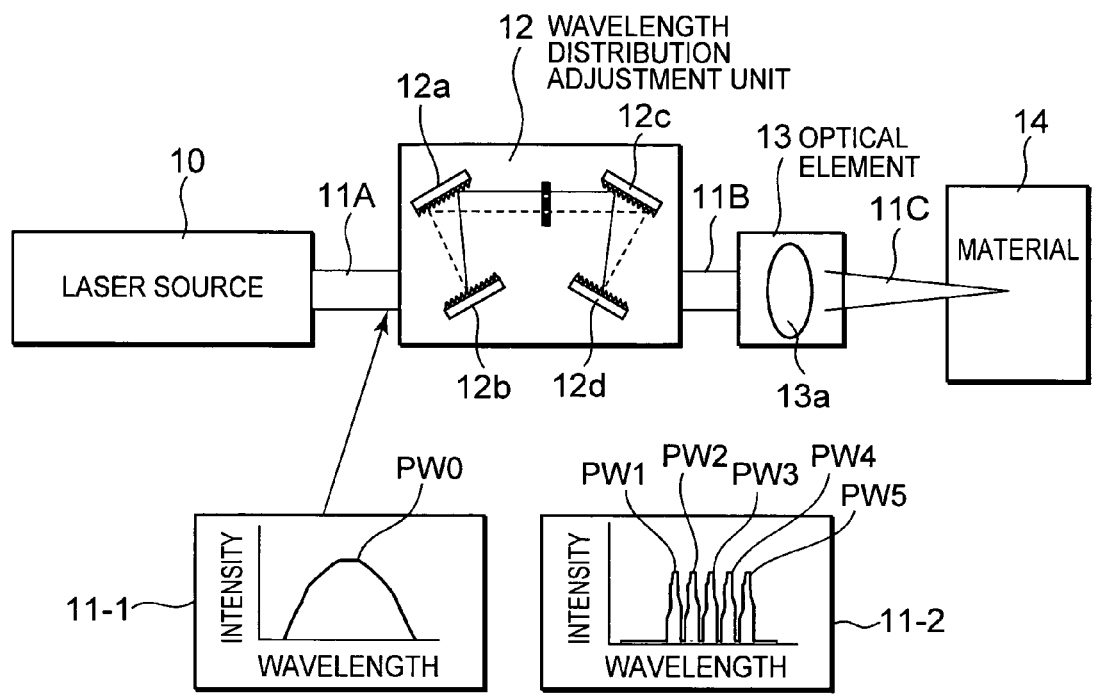
FIG. 1A is a block diagram illustrating a first preferred embodiment of the laser processing device according to the current invention.

Referring now to the drawings, wherein like reference numerals designate corresponding structures throughout the views, and referring in particular to FIG. 1A, a block diagram illustrates a first preferred embodiment of the laser processing device according to the current invention. The preferred embodiment further includes a laser source 10, a wavelength distribution adjustment unit 12 and an optical element 13. The laser source 10 generates an original laser beam 11A having a relatively wide range of wavelengths such as Ti: Sahhire laser. As shown in a graph 11-1, the original laser beam 11A has a single peak PW0 in intensity levels in a bell curve that is distributed over a wide range of wavelengths. In general, the wavelength distribution adjustment unit 12 adjusts or redistributes the wavelengths of the original laser beam 11A into a predetermined number of peaks. For example, the wavelength distribution adjustment unit 12 redistributes the wavelengths of the original laser beam 11A into five peak wavelengths PW1, PW2, PW3, PW4 and PW5 as illustrated in a graph 11-2 in an adjusted laser beam 11B. The adjusted laser beam 11B is focused by an optical element 13 such as a lens 13a so as to direct a focused adjusted laser beam 11C onto the material 14.

Still referring to FIG. 1A, the adjusted wavelength distribution includes five distinct peaks over the same range of the original laser beam. The intensity of each of the five distinct peaks is substantially the same as that of the original laser beam. Although the five distinct distribution curves are adjacent or juxtaposed with each other, the relationship between the two adjacent peaks is selectively modified. Furthermore, a number of the peaks is not limited to five. In other words, the number of the peaks and the distance between the adjacent peaks are selectively variable according to the parameters of the wavelength distribution adjustment unit 12.

To accomplish the above adjustment of the wavelength distribution, various means are available to redistribute the wavelengths. The wavelength distribution adjustment unit 12 of one preferred embodiment further includes diffraction gratings 12a, 12b, 12c and 12d for causing spatial wavelength distribution. The distributed wavelengths are spatially selected to generate the adjusted laser beam 11B. Alternatively, the wavelength distribution adjustment unit 12 further includes at least one pair of wavelength filters. For example, the wavelength filters include color glass filters and interference filters containing multiple layer films. By utilizing a thin film, laser in the area from the infrared and the deep ultraviolet areas to the X-ray area are usable. Furthermore, by utilizing a series of filters, various wavelength distribution patterns are formed. Similarly, by exchanging the various filter combinations, the material is being processed in a continuous manner. Yet another alternative embodiment of the wavelength distribution adjustment unit 12 further includes at least one pair of wavelength distribution elements and a spatial wavelength selector. The wavelength distribution elements include various elements such as holograms and lenses for causing a change in spatial transmission positions. The spatial wavelength selector further includes various elements such as a metal plate, a slit and a pin hole for controlling the passage of light due to its spatial position. The spatial wavelength selector also includes a photo mask. For example, the photo mask is formed on a transparent substrate by spraying chromium (Cr), and the laser passage area is spatially controlled by the reflective metal surface. By controlling the reflective film thickness, the transmission rate is continuously varied in the photo mask. A combination of the photo masks is also mounted on a movable stage, and the stage is moved synchronously with the laser emission timing. When the above wavelength filters are used, the laser beam is transmitted to a direct transmission means such as a lens for focusing at a unique focal length of the corresponding wavelength.

Figure 1B:
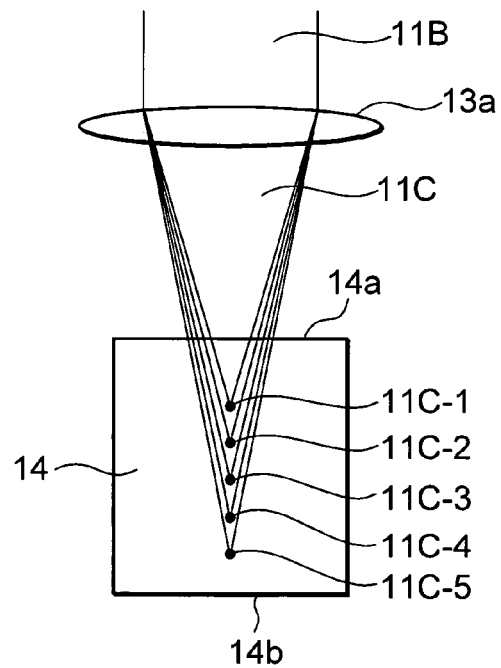
FIG. 1B is a diagram illustrating an enlarged view of the adjusted laser beam 11B and the focused adjusted laser beam 11C with respect to the material 14 according to the current invention.

Now referring to FIG. 1B, a diagram illustrates an enlarged view of the adjusted laser beam 11B and the focused adjusted laser beam 11C with respect to the material 14 according to the current invention. The focused adjusted laser beam 11C has multiple focal points 11C-1, 11C-2, 11C-3, 11C-4 and 11C-5, each of which respectively corresponds to one of the five peak wavelengths PW1, PW2, PW3, PW4 and PW5 as shown in the graph 11-2. The five focal points 11C-1, 11C-2, 11C-3, 11C-4 and 11C-5 concurrently exist at varying depths from a surface 14a when the lens 13a and the adjusted laser beam 11B are placed at an appropriate position with respect to the material 14. As already described above, the number of the focal points and the distance between the adjacent focal points are independently variable according to the parameters in the wavelength distribution adjustment unit 12. Furthermore, the intensity of each wavelength at the corresponding focal point is also independently variable with respect to other wavelengths. For example, an intensity level at the focal point 11C-2 is independently set from that at other focal points 11C-1, 11C-3, 11C-4 and 11C-5. The intensity at the focal point 11C-2 is determined by the intensity level at the corresponding wavelength PW2 and or the duration of the application of the wavelength PW2 with respect to other wavelengths PW1, PW3, PW4 and PW5. The intensity level adjustment is also combined with other independent parameters including the number of the focal points and the distance between the focal points. The focal position determines the position or depth of the structure that is formed by the laser beam while the intensity and the duration of the laser determine the configuration or size of the formed structure. Thus, an overall burn pattern by the focused adjusted laser beam 11C is selectively controlled according to the above described independent parameters.

In one preferred operation of the first preferred embodiment, the focused adjusted laser beam 11C concurrently containing the five wavelength components is applied onto the material 14. Consequently, five structures are simultaneously formed at the focal points 11C-1, 11C-2, 11C-3, 11C-4 and 11C-5 according to the predetermined combination of the above independent parameters of the focused adjusted laser beam 11C. In an alternative operation of the first preferred embodiment, the focused adjusted laser beam 11C concurrently containing less than the five wavelength components is applied onto the material 14. Consequently, less than five structures are simultaneously formed at the corresponding ones of the focal points 11C-1, 11C-2, 11C-3, 11C-4 and 11C-5 according to the predetermined combination of the above independent parameters of the focused adjusted laser beam 11C. The remaining desired structures are sequentially formed by the subsequent application of the focused adjusted laser beam 11C. One example of the sequential formation is to form a structure at a time near the surface 14a towards a bottom 14b of the material 14.

Figure 2:
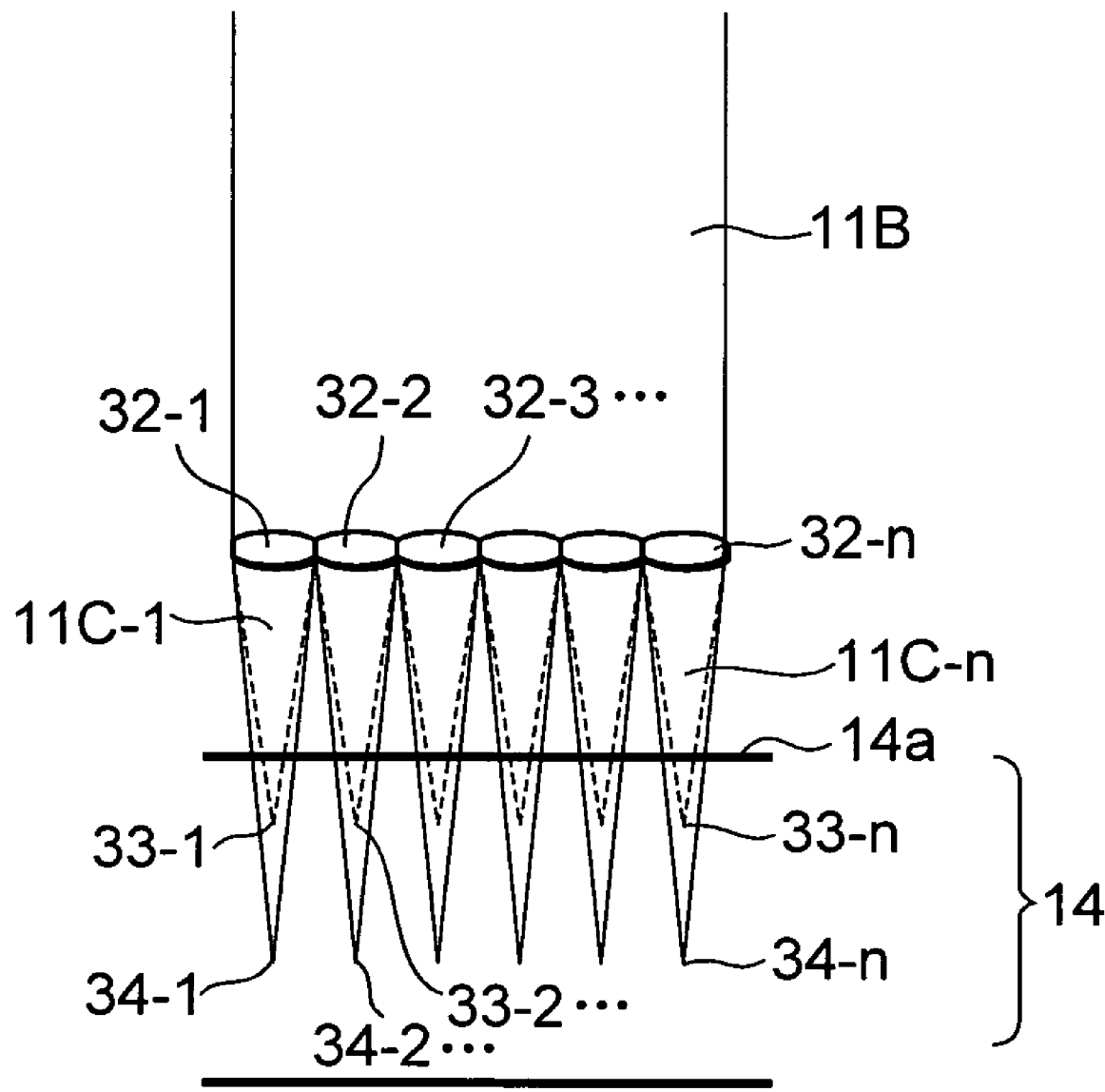
FIG. 2 is a block diagram illustrating a second preferred embodiment of the laser processing device according to the current invention.

Now referring to FIG. 2, a block diagram illustrates a second preferred embodiment of the laser processing device according to the current invention. The block diagram illustrates a part of the second preferred embodiment of the laser processing device, and other components of the second preferred embodiment are substantially identical to those of the first preferred embodiment of FIG. 1. The adjusted laser beam 11B is focused by a micro lens array such as a plurality of focal lenses 32-1 through 32-n to form corresponding focused adjusted laser beams 11C-1 through 11C-n with respect to the material 14 according to the current invention. Each of the focused adjusted laser beams 11C-1 through 11C-n has multiple focal points such as 33-1 and 34-1, each of which respectively corresponds to one of the peak wavelengths of the adjusted laser beam 11B. Pairs of focal points 33-1 and 34-1 through 33-n and 34-n concurrently exist at varying locations over a surface 14a and depths from the surface 14a when the lenses 32-1 through 32-n and the adjusted laser beam 11B are placed at an appropriate position with respect to the material 14.

As already described above, the number of the focal points and the distance between the adjacent focal points are independently variable according to the parameters in the wavelength distribution adjustment unit 12. Furthermore, the intensity of each wavelength at the corresponding focal point is also independently variable with respect to other wavelengths. For example, an intensity level at the focal point 33-1 is independently set from that at another focal point such as 33-n at another location. The intensity level adjustment is also combined with other independent parameters including the number of the focal points and the distance between the focal points as well as a number of locations based upon the focal lenses. The focal position determines the position or depth of the structure that is formed by the laser beam while the intensity and the duration of the laser determine the configuration or size of the formed structure. Thus, an overall burn pattern by the focused adjusted laser beams 11C-1 through 11C-n is selectively controlled according to the above described independent parameters. In the second preferred embodiment, although only two focal points are illustrated for each of the six focal lenses 32-1 through 32-6, the number of the focal points and the number of the focal lenses are not limited to the illustration. Furthermore, the configuration of the micro array lens is also not limited to the horizontally arranged structure as shown.

Figure 3:
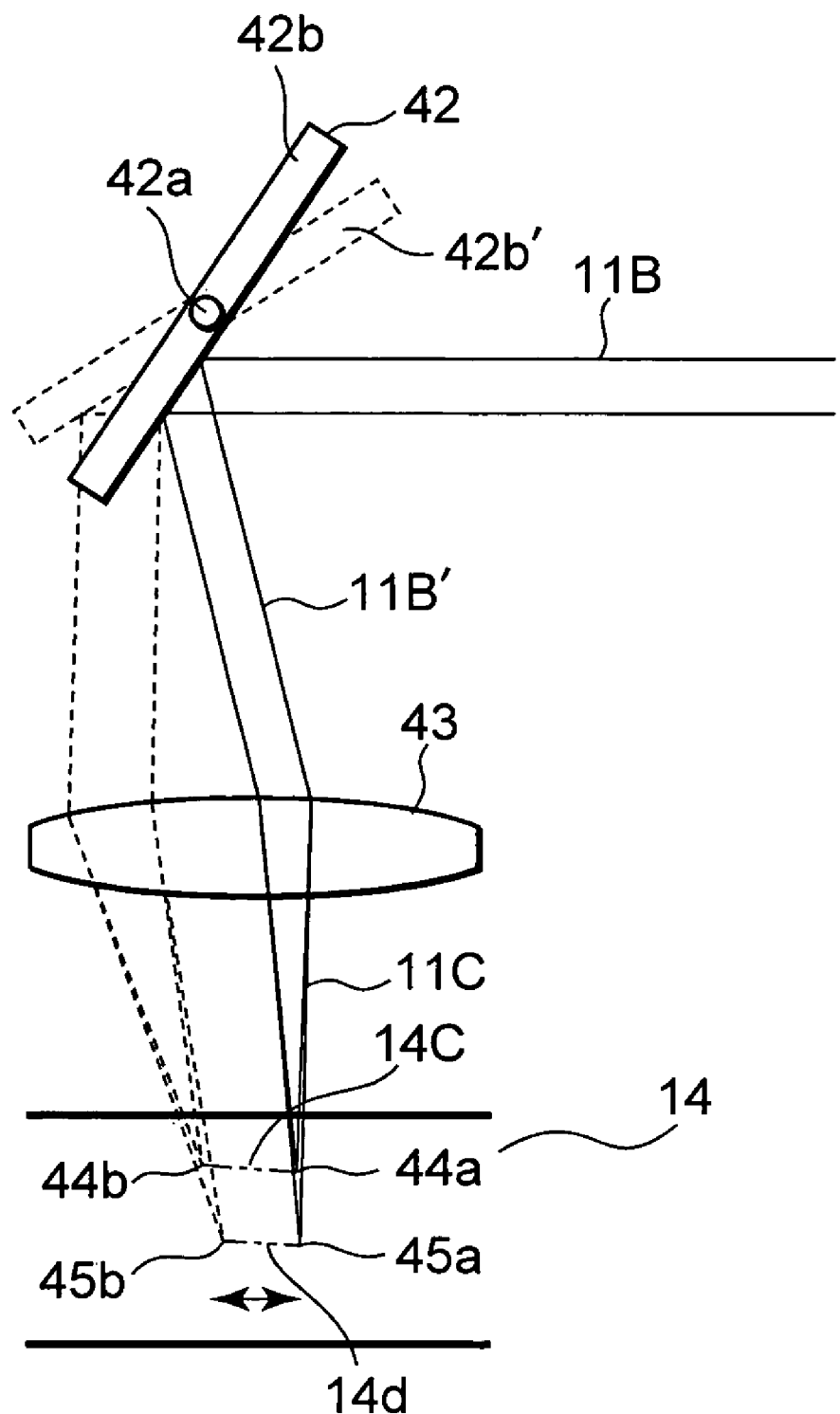
FIG. 3 is a block diagram illustrating a third preferred embodiment of the laser processing device according to the current invention.

Now referring to FIG. 3, a block diagram illustrates a third preferred embodiment of the laser processing device according to the current invention. The block diagram illustrates a part of the third preferred embodiment of the laser processing device, and other components of the third preferred embodiment are substantially identical to those of the first preferred embodiment of FIG. 1. The third preferred embodiment includes a laser scanning unit 42 such as a Galvano-mirror for scanning the adjusted laser beam 11B. The laser scanning unit 42 alternatively includes a polygon mirror. The Galvano-mirror 42 reflects the incoming adjusted laser beam 11B towards a focal lens 43 to emit a reflected adjusted laser beam 11B'. In turn, the reflected adjusted laser beam 11B' enters the focal lens 43 so that the focused laser beam 11C reaches the material 14. Consequently, the focused adjusted laser beam 11C forms at least focal point 43a and 45a within the material 14.

The Galvano-mirror 42 further includes a rotating axis 42a for rotating its reflective surface 42b to a predetermined position 42b' as illustrated in dotted lines. As a result of the rotation, the reflected adjusted laser beam 11B' and the focused adjusted laser beam 11C both are scanned to a predetermined position as illustrated in the dotted lines. Assuming that the adjusted laser beam 11B is maintained during the above movement of the laser scanning unit 42, after the focal points 44a and 45a both travel to new respective positions 44b and 45b, new structures 14c and 14d are now formed in the material 14 as indicated by double dotted lines. The formation of the new structures 14c and 14d depends upon a combination of the parameters associated with the adjusted laser beam 11B and the laser scanning unit 42. The parameters associated with the laser scanning unit 42 include the speed of the rotation of the Galvano-mirror 42 and the extent of the rotation. Although the scanning movement is illustrated in rotation as described with respect to the Galvano-mirror 42, the movement is not limited to rotation when a different type of the laser scanning unit is utilized.

Figure 4:
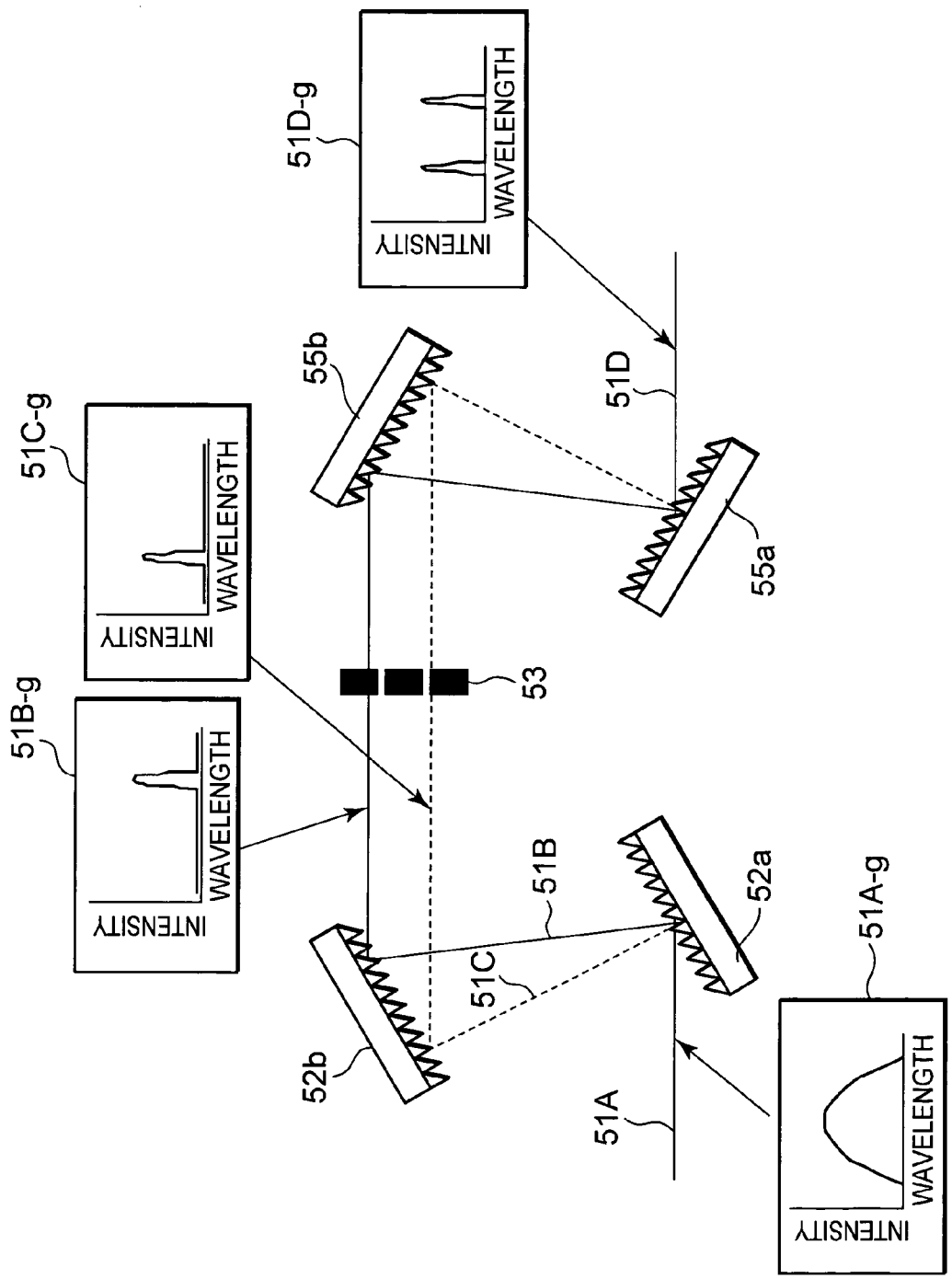
FIG. 4 is a block diagram illustrating a fourth preferred embodiment of the laser processing device according to the current invention.

Now referring to FIG. 4, a block diagram illustrates a fourth preferred embodiment of the laser processing device according to the current invention. The diagram illustrates the wavelength adjustment unit of the fourth preferred embodiment, and other components of the fourth preferred embodiment are substantially identical to those of the first preferred embodiment as shown in FIG. 1. In general, the fourth preferred embodiment is a wavelength adjustment unit. An input laser beam 51A has a wide range of wavelengths as illustrated in a graph 51A-g. A pair of diffraction gratings 52a and 52b spatially separate a certain range of wavelength from the input laser beam 51A to generate a first laser beam 51B and a second laser beam 51C. In detail, the input laser beam 51A enters the first diffraction grating 52a, which has the maximal diffraction rate in the positive linear direction with respect to the input wavelength of the input laser beam 51A. Consequently, the diffraction grating 52a transmits the input laser beam 51A at a different reflection angle for each of the wavelengths of the input laser beam 51A. For example, the first laser beam 51B has a sharp peak over one narrow range of the wavelength as illustrated in a graph 5B-g. On the other hand, the second laser beam 51C has a sharp peak over another narrow range of the wavelength as illustrated in a graph 51C-g. The input laser beam 51A then reaches the second diffraction grating 52b, which is substantially identical to the first diffraction grating 52a. However, the second diffraction grating 52b is placed in such a manner that the reflected laser beams 51B and 51C are in parallel and have spatially distributed wavelengths. A spatial wavelength selector 53 spatially controls the passage of the reflected laser beams 51B and 5C. Subsequently, the spatial distribution of the transmitted laser beams 51B and 51C is controlled by a second pair of diffraction gratings 55a and 55b to merge the two beams 5B and 5C. An output laser beam 51D has two narrow ranges of wavelengths, and each of the ranges has a sharp peak as illustrated in a graph 51D-g. The output laser beam 51D thus has been modified in the wavelength distribution by adjusting a pitch of the diffraction gratings. The adjusted output laser beam 51D is applied to the material for manufacturing desired structures at a predetermined depth from the surface. The second pair of the diffraction gratings 55a and 55b is alternatively replaced by a pair of reflective mirrors.

Figure 5:
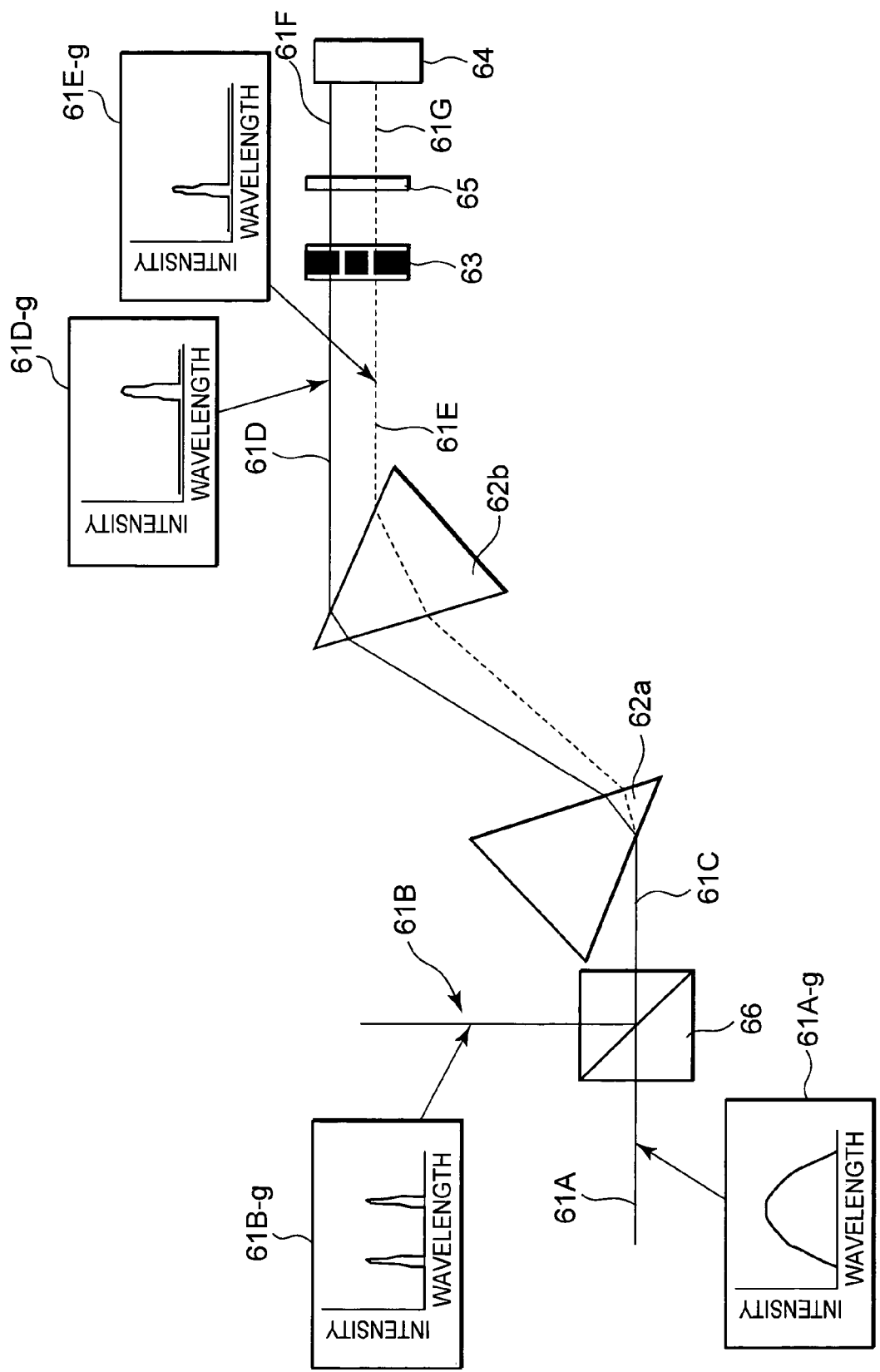
FIG. 5 is a block diagram illustrating a fifth preferred embodiment of the laser processing device according to the current invention.

Now referring to FIG. 5, a block diagram illustrates a fifth preferred embodiment of the laser processing device according to the current invention. The block diagram illustrates a part of the fifth preferred embodiment of the laser processing device, and other components of the fifth preferred embodiment are substantially identical to those of the first preferred embodiment of FIG. 1. The laser processing device of the fifth preferred embodiment includes prisms 62a and 62b as the wavelength distribution elements. An input laser beam 61A has a broad range of wavelengths in a bell-curved distribution as shown in a graph 61A-g. An output laser beam 61B has two narrow ranges of wavelengths in a sharp peak distribution as shown in a graph 61B-g. After the input laser beam 61A entering a polarization beam splitter 66, the input laser beam 61A exits the polarization beam splitter 66 as a third beam 61C before entering a pair of the prisms 62a and 62b. The polarization of the entering beam 61C is the direction that maximizes the transmittance of the polarization beam splitter 66. By placing the position and the vertical angle of the prism pair 62a and 62b in a predetermined manner, the laser beams 61D and 61E exiting from the prism pair 62a and 62b are spatially distributed by wavelengths and are parallel with each other. The laser beam 61D now includes one peak as shown in the wavelength distribution 61D-g while the laser beam 61E now includes another peak as shown in the wavelength distribution 61E-g.

Still referring to FIG. 5, the isolated peaks of wavelengths are now further processed. Subsequently, the spatial wavelength selector 63 controls the passage of the parallel laser beams 61D and 61E in order to further adjust the wavelength distribution. In this example, neither of the peaks is blocked by the spatial wavelength selector 63. A ¼ wavelength plate 65 circularly polarizes the laser beams to generate circularly polarized beams 61F and 61G, which are reflected back by a mirror 64 to return to the same optical paths. By transmitting through the ¼ wavelength plate 65 for the second time, the reflected laser beams change their polarization by ninety degrees and transmit through the spatial wavelength selector 63 and the prism pair 62a and 62b. The reflected laser beam 61C entering in the polarization beam splitter 66 is now reflected as the output laser beam 61B, which now has two narrow ranges of wavelengths and each range has a sharp peak distribution as shown in a graph 61B-g. In the above described preferred embodiment, the prism pair 62a and 62b has an identical vertical angle for the facilitated implementation. Furthermore, by coating the prism pair 62a and 62b with a non-reflective surface material, the wavelength distribution is efficiently converted into a spatial intensity distribution without substantial loss.

Figure 6:
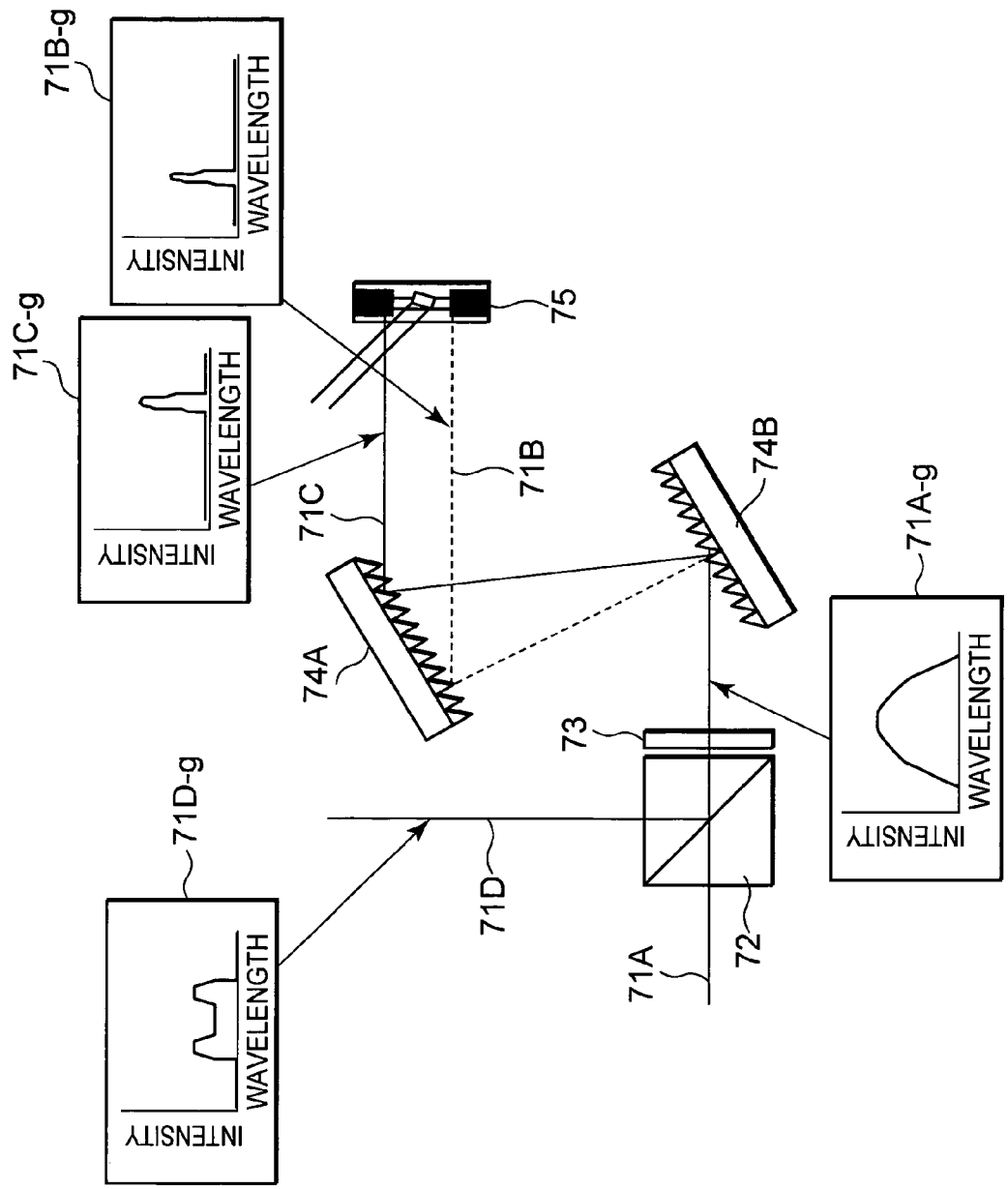
FIG. 6 is a block diagram illustrating a sixth preferred embodiment of the laser processing device according to the current invention.

Now referring to FIG. 6, a block diagram illustrates a sixth preferred embodiment of the laser processing device according to the current invention. The block diagram illustrates a part of the sixth preferred embodiment of the laser processing device, and other components of the sixth preferred embodiment are substantially identical to those of the first preferred embodiment of FIG. 1. The laser processing device of the sixth preferred embodiment includes the wavelength distribution unit such as diffraction gratings 74A and 74B and a spatial intensity adjustment unit for the wavelength selection unit. The spatial intensity adjustment unit further includes reflective-type or transparent-type liquid crystal elements, reflective-type digital micro mirror devices (DMD) and micro electronic mechanical system (MEMS) elements. An input laser beam 71A has a broad range of wavelengths in a bell-curved distribution as shown in a graph 71A-g. An output laser beam 71D has two narrow ranges of wavelengths in two small peaks that are fused together as shown in a graph 71D-g.

Still referring to FIG. 6, the input laser beam 71A is processed to generate the output laser beam 71B. The input laser beam 71A goes through a polarization splitter 72 and a ¼ wavelength plate 73. The input laser beam 71A is processed by a pair of the diffraction gratings 74A and 74B to form a predetermined wavelength distribution in a first laser beam 71B having a single sharp peak as shown in a distribution 71B-g and a second laser beam 71C having another single sharp peak as shown in a distribution 71C-g. A part of the two laser beams 71B and 71C is reflected by a DMD element 75 to be retuned to the original optical path. The rest of the two laser beams 71B and 71C is reflected to a predetermined direction other than the original optical path and is not further utilized for the adjustment. The returned portion of the two laser beams 71B and 71C is rotated 90 degrees by the ¼ wavelength plate 73 and is reflected as an adjusted laser beam 71D having the wavelength distribution as illustrated in a graph 71D-g. Thus, the input laser beam 71A has been adjusted to a desired distribution pattern in the output laser beam 71D according to the predetermined parameters of the DMD device 75. The adjusted laser beam 71D is utilized to generate a desired structure in the material via an optical element such as a lens.

Alternatively, a plurality of the reflective elements is used as the spatial intensity varying unit. An external control unit controls a pattern of the reflection by the multiple reflective elements. The multiple reflective elements include the reflective-type digital micro mirror devices (DMD). It is preferred that the control of the multiple reflective elements is synchronized with the laser emitting timing. Furthermore, if a material to be processed is physically moved by a transport means, the above control is also synchronized with the transport means.

Figure 7A:
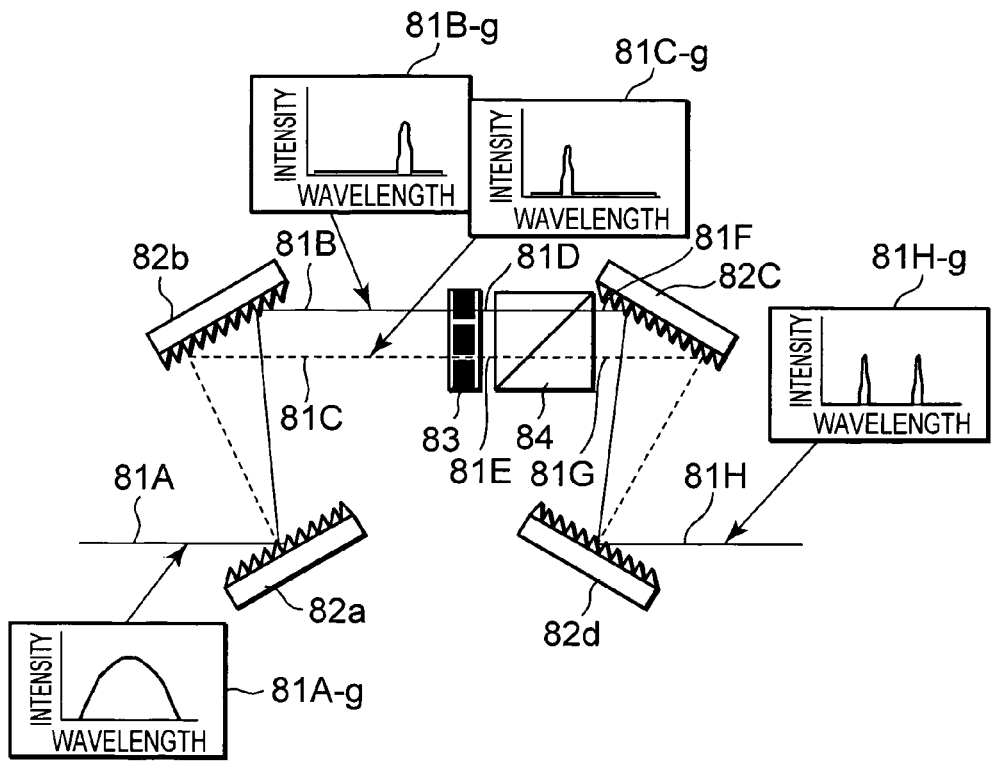
FIG. 7A is a block diagram illustrating a seventh preferred embodiment of the laser processing device according to the current invention.

Now referring to FIG. 7A, a block diagram illustrates a seventh preferred embodiment of the laser processing device according to the current invention. The diagram illustrates the wavelength adjustment unit of the seventh preferred embodiment, and other components of the seventh preferred embodiment are substantially identical to those of the first preferred embodiment as shown in FIG. 1. In general, the seventh preferred embodiment is a transparent type wavelength adjustment unit. Transparent crystal liquid is used as a spatial intensity adjustment unit. An input laser beam 81A has a wide range of wavelengths as illustrated in a graph 81A-g. A pair of diffraction gratings 82a and 82b spatially separate a certain range of wavelength from the input laser beam 81A to generate a first laser beam 81B and a second laser beam 81C. The first laser beam 81B has a narrow range of wavelengths in a sharp single peak as illustrated in a graph 81B-g while the second laser beam 81C has another narrow range of wavelengths also in a sharp single peak as illustrated in a graph 81C-g. Subsequently, a transparent-type liquid crystal 83 partially polarizes the first laser beam 81B and the second laser beam 81C. By inputting an intermediate value, the polarization angle is controlled in a desired direction. After going through the liquid crystal 83, a certain portion of the partially polarized beams 81D and 81E transmits through a polarization beam splitter 84 while the rest or is reflected by a polarization beam splitter 84 depending upon the polarization direction. As a result of the above selection, the wavelength distribution of the transmitted laser beams 81F and 81G is controlled. Subsequently, the spatial distribution of the transmitted laser beams 81F and 81G is controlled by another pair of diffraction gratings 82c and 82d. An output laser beam 81H has two narrow ranges of wavelengths, and each of the ranges has a sharp peak as illustrated in a graph 81H-g. The output laser beam 81H thus has been adjusted in the wavelength distribution and the laser intensity for the wavelength. The adjusted output laser beam 81H is applied to the material for manufacturing desired structures at a predetermined depth from the surface.

Figure 7B:
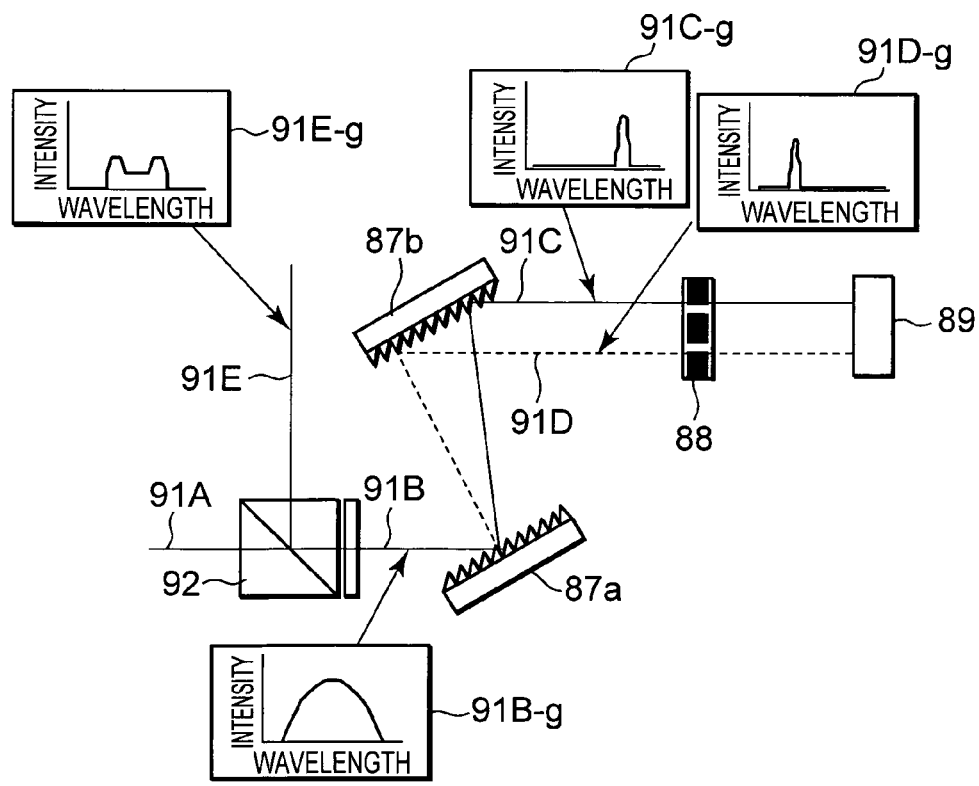
FIG. 7B is a block diagram illustrating an eighth preferred embodiment of the laser processing device according to the current invention.

Now referring to FIG. 7B, a block diagram illustrates an eighth preferred embodiment of the laser processing device according to the current invention. The diagram illustrates the wavelength adjustment unit of the eighth preferred embodiment, and other components of the eighth preferred embodiment are substantially identical to those of the first preferred embodiment as shown in FIG. 1. In general, the eighth preferred embodiment is a reflective type wavelength adjustment unit. An input laser beam 91A transmits through a polarization beam splitter 92, and a transmitted input laser beam 91B has a wide range of wavelengths as illustrated in a graph 81B-g. A pair of diffraction gratings 87a and 87b spatially separate a certain range of wavelength from the input laser beam 91B to generate a first laser beam 91C and a second laser beam 91D. The first laser beam 91C has a narrow range of wavelengths in a sharp single peak as illustrated in a graph 91C-g while the second laser beam 91D has another narrow range of wavelengths also in a sharp single peak as illustrated in a graph 91D-g. Subsequently, a transparent-type liquid crystal 88 partially polarizes the first laser beam 91C and the second laser beam 91D, and a mirror or a reflective liquid crystal 89 reflects the first and second laser beams 91C and 91D, which have a different spatial polarization direction, back into the original optical paths towards the polarization beam splitter 92. Depending on the polarization direction, a part of the reflected and merged beam is transmitted while the other part is reflected as an output laser beam 91E. The output laser beam 91E has two narrow ranges of wavelengths, and each of the ranges has a short and merged peaks as illustrated in a graph 91E-g. The output laser beam 91E thus has been adjusted in the wavelength distribution and the laser intensity for the wavelength. The adjusted output laser beam 91E is applied to the material for manufacturing desired structures at a predetermined depth from the surface.

Figure 8:
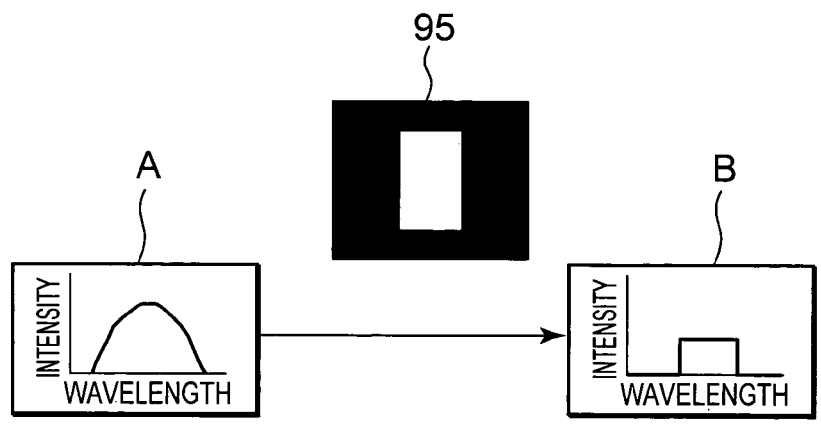
FIG. 8 is a block diagram illustrating a ninth preferred embodiment of the laser processing device according to the current invention.

Now referring to FIG. 8, a block diagram illustrates a ninth preferred embodiment of the laser processing device according to the current invention. The diagram illustrates the laser beam intensity adjustment unit of the ninth preferred embodiment, and other components of the ninth preferred embodiment are substantially identical to those of the first preferred embodiment as shown in FIG. 1. The laser beam intensity adjustment unit includes an intensity adjustor for adjusting the intensity of an incoming laser beam over a range of wavelengths. For example, a gray mask 95 is placed before the spatial wavelength selector for spatially controlling the transmittance of the laser beams. The gray mask 95 varies the transmittance rate over the wavelength space or range. An input laser beam as illustrated in a diagram A is inputted into the gray mask 95. The input laser beam has a wide range of wavelengths in a bell-curve distribution for their intensity. The gray mask 95 adjust the intensity level of the input laser beam in such manner that an output laser beam from the gray mask 95 has a rectangular shape over a narrower range of wavelength with a predetermined constant intensity value as shown in a graph B. As described above, the intensity level is variably adjusted for each wavelength to generate a common intensity value for manufacturing desired structures at a predetermined depth from the surface.

In the above described preferred embodiments, certain laser sources are used in order to improve the processing position precision and control. Consequently, high precision manufacturing and low-energy processing are implemented, and the wavelength distribution control is facilitated. The laser sources include a wide range laser such as white-color laser, color laser and Ti: Sapphire laser and fiber laser. For extremely short femt second laser, since it is theoretically necessary to widen an oscillation pulse width for generating pulses, new laser has been developed to oscillate over a wide range of over 10 nm. Furthermore, the laser sources also include a wavelength adjusted laser beam that has been converted by a wavelength adjustment unit. For example, the wavelength adjustment unit generates a wide range of wavelengths by passing extremely short pulse laser through fibers containing gas or photonic liquid crystal.

In the above described preferred embodiments, certain refraction materials and elements are used in the laser beam transmission unit of the laser processing device in order to enlarge a control range of the processing position and or the processing configuration. Furthermore, the above certain refraction materials and elements also reduce the manufacturing costs of the laser processing device due to simpler components. A large refraction material having a large amount of dispersion is used in the laser beam transmission unit. The refraction material includes lenses and prisms. A combination of two or more materials is simultaneously used in the laser beam transmission unit. The refraction material preferably has a large amount of dispersion for the input wavelength range. It is also possible to combine the refraction material with an element having less dispersion over a part of the wavelength range. Since the refraction rate varies depending upon the wavelength based upon the above combined refraction material, the focal point is changed for some of the wavelengths in order to control the processing configuration and position. In addition, by placing a control element for controlling the spatial position of the beam transmission according to dispersion, the transmission distance is elongated. For example, the lens width may be thickened, and the implementation is practical. The material preferably has a large amount of dispersion for the incoming wavelength range. The material is alternatively combined with an element having a less amount of dispersion so that the processing position is controlled. One implementation is to place at least a parallel transparent substrate on the laser beam focusing side.

Figure 9:
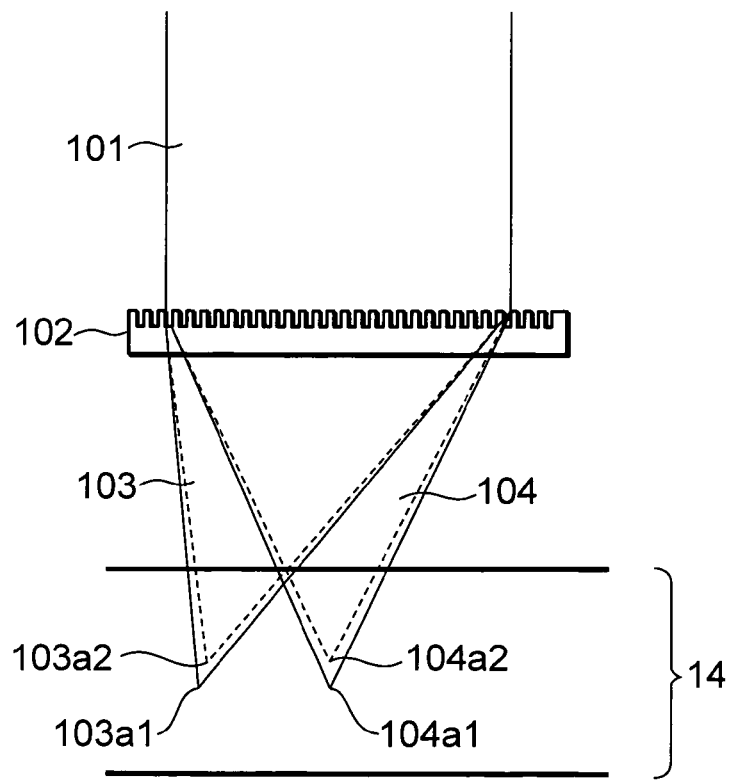
FIG. 9 is a block diagram illustrating a tenth preferred embodiment of the laser processing device according to the current invention.

Now referring to FIG. 9, a block diagram illustrates a tenth preferred embodiment of the laser processing device according to the current invention. The diagram illustrates the laser beam transmission unit of the tenth preferred embodiment, and other components of the tenth preferred embodiment are substantially identical to those of the first preferred embodiment as shown in FIG. 1. The laser beam transmission unit includes a diffraction grating 102 such as a holographic element for simultaneously focusing an incoming laser beam 101 at two locations 103 and 104 in the material 14. Assuming that the incoming laser has at least a two-sharp-peak wavelength distribution pattern, the incoming laser beam 101 is focused at two depths 103$a$1 and 103$a$2 for the first location 103 as well as at two depths 104$a$1 and 104$a$2 for the second location 104. Consequently, internal processing takes place at the two depths of the two locations. Furthermore, a large area is also alternatively processed by implementing a scanning mechanism for the laser beam 101 or the material 14.

Figure 10:
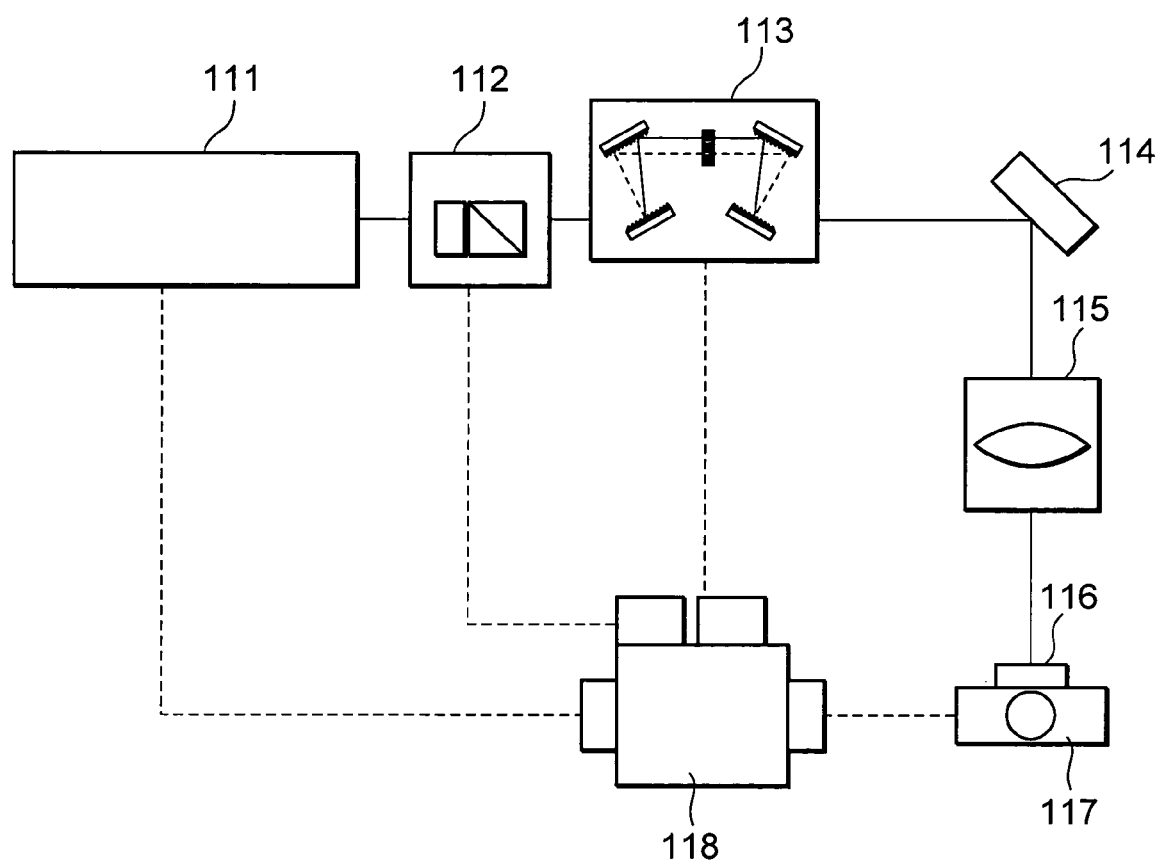
FIG. 10 is a block diagram illustrating an eleventh preferred embodiment of the laser processing device according to the current invention.

Now referring to FIG. 10, a block diagram illustrates an eleventh preferred embodiment of the laser processing device according to the current invention. In general, each component of the above described preferred embodiments is synchronously controlled by a control unit in order to adjust the depth and the position of the manufacturing process in the material. An extremely short pulse laser source 111 generates a laser beam with a wide range of wavelengths. A laser beam intensity adjustment unit 112 receives the laser beam and adjusts the intensity. The intensity adjusted beam is transmitted to a spatial wavelength dispersion/distribution adjustment unit 113. After the wavelength dispersion/distribution has been adjusted by the spatial wavelength dispersion/distribution adjustment unit 113, the laser beam reaches an optical transmission unit 115 such as a lens via a mirror 114. The lens 115 has a varying focal point depending upon the wavelength. Consequently, the laser beam is projected onto a surface of a material 116 that is fixed on a stage 117. A controller 118 such as a personal computer (PC) is operationally connected to the extremely short pulse laser source 111, the laser beam intensity adjustment unit 112, the spatial wavelength dispersion/distribution adjustment unit 113 and the stage 117 for synchronously controlling certain aspects of the above connected units. By controlling the above connected units 111, 112, 113 and 117, the processing depth and location are precisely controlled for the laser processing device according to the current invention.

Figure 11:
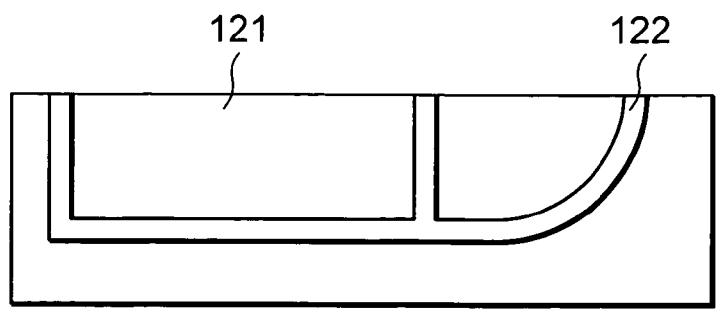
FIG. 11 is a diagram illustrating a side view of an exemplary configuration or element of the material that has been processed by the laser processing device according to the current invention.

Now referring to FIG. 11, a diagram illustrates a side view of an exemplary configuration or element of the material that has been processed by the laser processing device according to the current invention. In general, a first configuration includes a minute hole and a refraction varying area inside a transparent substrate, and these structures have been processed by controlling the processing position and the configuration at a high precision level. The processed configuration dot configurations, line configurations and layered surfaces, and the depth may not be constant. The depth in fact may partially vary in the configuration. For example, a continuous hole 122 is formed in a material 121. The processed element 122 includes a bore configuration whose processed position is precisely controlled in the depth direction. The process element 121 is used as an optical element such as a diffraction element, a MEMS element, a micro channel or a duplicate template for these elements.

Figure 12:
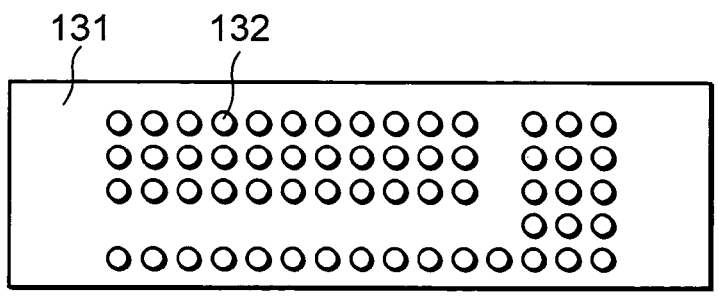
FIG. 12 is a diagram illustrating a top view of another exemplary configuration or element of the material that has been processed by the laser processing device according to the current invention.

Now referring to FIG. 12, a diagram illustrates a top view of another exemplary configuration or element of the material that has been processed by the laser processing device according to the current invention. The second exemplary element includes refraction rate varying portions whose surface depth position has been controlled at a high precision. The processed configuration includes dot configurations, line configurations and layered surfaces, and the depth may not be constant. The depth in fact may partially vary in the configuration. For example, in a material 131, a pattern of varying points 132 is formed. Since the position of the varying point is flexibly arranged, the material 131 is used as optical elements such as photo crystal and guiding channel, hologram elements, refraction varying type diffraction elements and multilayered recording media. By utilizing a material with a significantly varying laser absorption rate, a high speed processing is performed at a reduced energy level.

Figure 13:
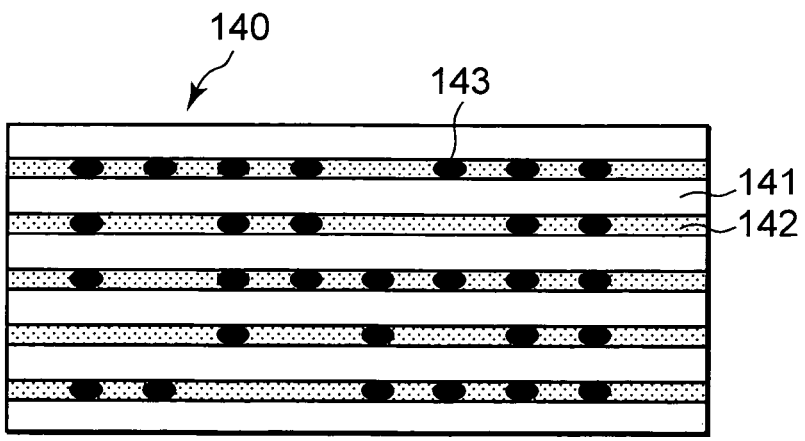
FIG. 13 is a diagram illustrating a cross sectional view of yet another exemplary configuration or element of the material that has been processed by the laser processing device according to the current invention.

Now referring to FIG. 13, a diagram illustrates a cross sectional view of yet another exemplary configuration or element of the material that has been processed by the laser processing device according to the current invention. The third exemplary element includes refraction rate varying portions whose surface depth position has been controlled at a high precision. The laser processing device processes the third element to target internal transparent portions that easily vary by the laser beam. The varying portions are layered or lined. For example, by alternately arranging multiple layers of an easily varying layer and a non-varying layer, the varying areas are spatially selected for processing. By changing the layer thickness, the total varying area is controlled. The processed configuration includes dot configurations, line configurations and layered surfaces, and the depth may not be constant. The depth in fact may partially vary in the configuration. For example, in a material 140, a pattern of varying points 143 is formed. The material 140 includes a layer of non-varying portion 141 and a layer of varying portion 142 with respect to the predetermined processing laser beam. Since the laser beam is focused at a plurality of points near each of the varying portions, by varying the wavelength pattern in time, the varying portions 143 have been arbitrarily positioned to record information so that the material 140 is used as a recording medium. Furthermore, even if the long focusing area is designed, only the above transparent varying area or the varying layer 142 varies without fail, the recording medium is implemented with a few errors. By utilizing a material with a significantly varying laser refraction rate, a high speed processing is performed at a reduced energy level. Even if the laser beam projection is off a predetermined target area, the process position change is minimized, and the processing position control is facilitated for a high precision control. Spatially selected processing of only the varying layers is feasible, and the processing width is controlled by the varying layer thickness.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of processing a material by a laser beam, comprising the steps of:
   inputting a laser beam having a first predetermined number of peaks over a predetermined range of wavelengths in a first distribution pattern;
   modifying the first distribution pattern to a second redistribution pattern that has a predetermined desired distribution pattern having a second predetermined number of peaks over the predetermined range of the wavelengths;
   focusing over the material the laser beam having the desired redistribution pattern of the wavelengths; and
   simultaneously forming a predetermined set of configurations at a different depth from a surface of the material by the focused laser beam.

2. The method of processing a material by a laser beam according to claim 1 wherein said modifying step further comprises additional steps of:
   spatially separating the laser beam into at least two laser beams, each of the laser beams having a sharp peak over a predetermined narrow range of the wavelengths; and
   merging the two laser beams into a single laser beam having at least two of the sharp peaks each over a predetermined narrow range of the wavelengths.

3. The method of processing a material by a laser beam according to claim 2 wherein said focusing step focuses the merged single laser beam on at least two focal points.

4. The method of processing a material by a laser beam according to claim 3 wherein the focal points are each located at a different depth with respect to a surface of the material.

5. The method of processing a material by a laser beam according to claim 3 wherein the focal points are each located at a different position with respect to a surface of the material.

6. The method of processing a material by a laser beam according to claim 3 wherein the focal points are each located at a combination of different depths and positions with respect to a surface of the material.

7. The method of processing a material by a laser beam according to claim 1 wherein said simultaneously processing step further comprises an additional step of scanning the focused laser beam.

8. The method of processing a material by a laser beam according to claim 1 wherein said simultaneously processing step further comprises an additional step of moving the material with respect to the focused laser beam.

9. The method of processing a material by a laser beam according to claim 1 further comprising an additional step of controlling a passage of a certain portion of the laser beam having the desired redistribution pattern of the wavelengths prior to said focusing step.

10. The method of processing a material by a laser beam according to claim 8 wherein said input step, said modifying step and said moving step are synchronously coordinated.

11. The method of processing a material by a laser beam according to claim 1 wherein the first distribution pattern is a broad range of the wavelengths in a bell-shaped distribution pattern, the second distribution pattern being a predetermined number of narrow ranges of the wavelengths each in a sharp peak.

* * * * *